P. SEURIN.
DEVICE FOR CONTROLLING FROM A DISTANCE THE WINDOWS OF MOTOR CARS AND OTHER VEHICLES.
APPLICATION FILED JAN. 25, 1921.

1,375,612.

Patented Apr. 19, 1921.

INVENTOR
PIERRE SEURIN
BY
ATTORNEYS

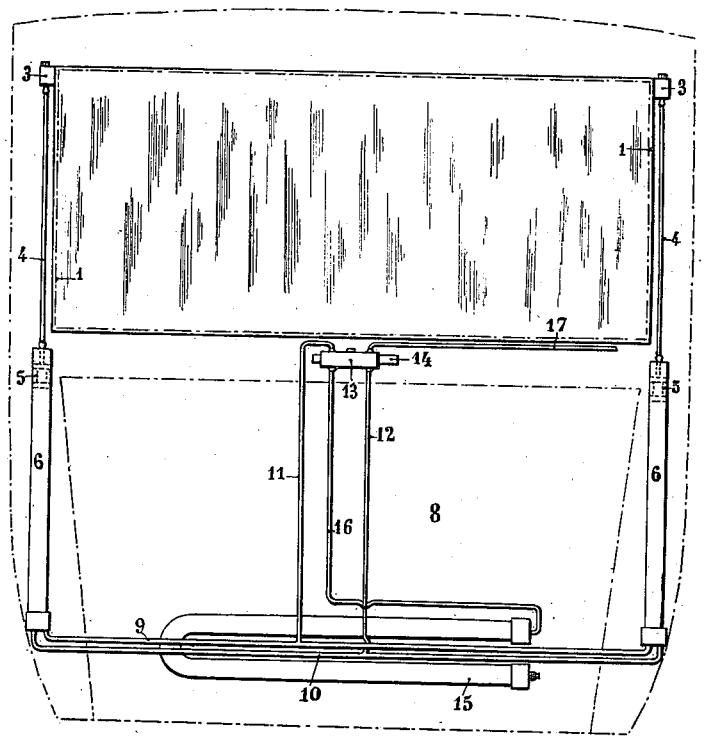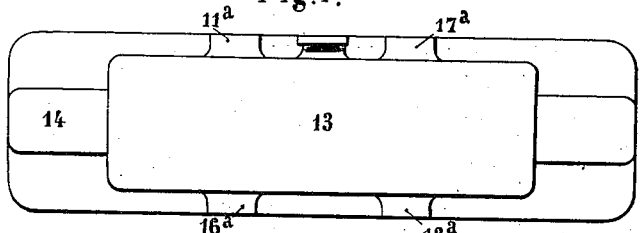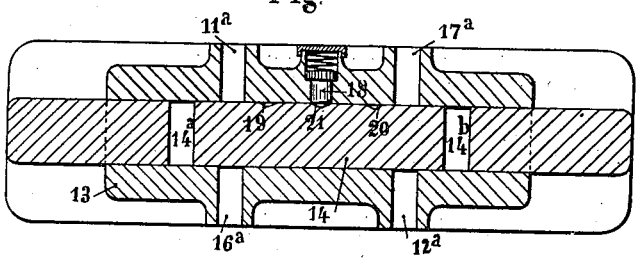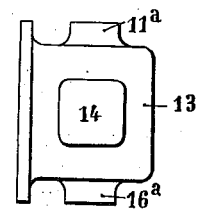

P. SEURIN.
DEVICE FOR CONTROLLING FROM A DISTANCE THE WINDOWS OF MOTOR CARS AND OTHER VEHICLES.
APPLICATION FILED JAN. 25, 1921.
1,375,612.
Patented Apr. 19, 1921.
3 SHEETS—SHEET 3.
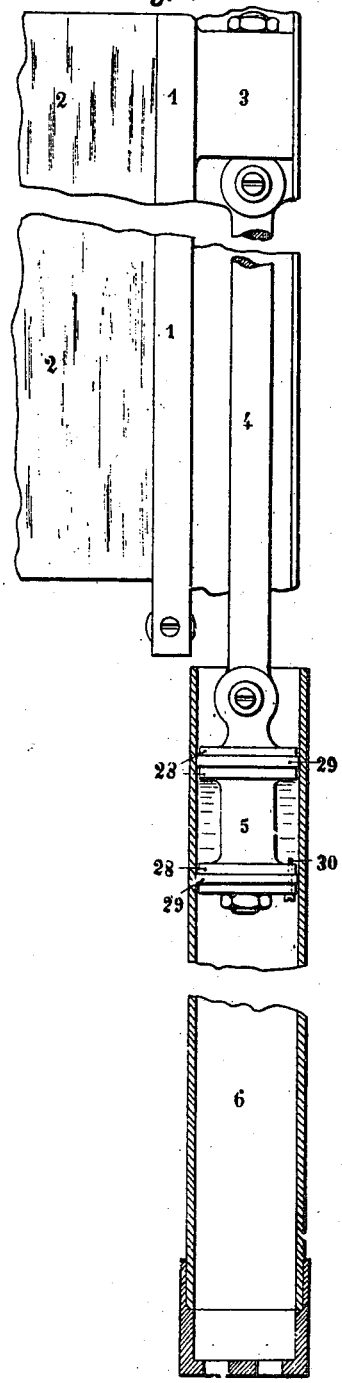
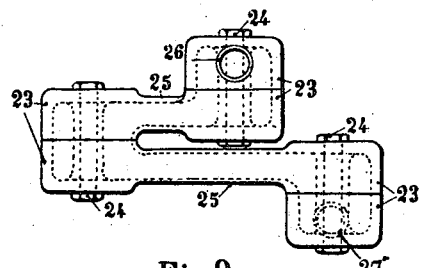
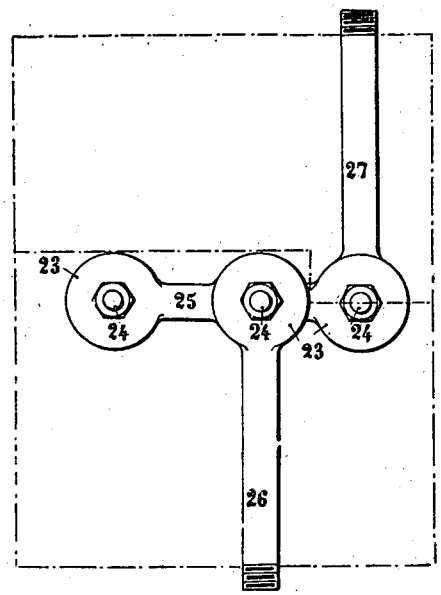
INVENTOR
PIERRE SEURIN
BY
ATTORNEYS

UNITED STATES PATENT OFFICE.

PIERRE SEURIN, OF PARIS, FRANCE.

DEVICE FOR CONTROLLING FROM A DISTANCE THE WINDOWS OF MOTOR-CARS AND OTHER VEHICLES.

1,375,612.   Specification of Letters Patent.   Patented Apr. 19, 1921.

Application filed January 25, 1921. Serial No. 439,862.

*To all whom it may concern:*

Be it known that I, PIERRE SEURIN, of 84 Rue Lauriston, Paris, France, coach-builder, have invented Devices for Controlling from a Distance the Windows of Motor-Cars and other Vehicles, of which the following is a full, clear, and exact description.

This invention relates to an air pressure device for controlling or operating from a distance the windows or glass-panes of doors, front frames and partitions of motor-cars, which device can be used for controlling the movable windows of vehicles such as motor-buses, tram-cars, railway-cars and the like.

This device essentially comprises: an air pressure tank; two cylinders arranged on each side of the window under control and in each of which can move an operating piston the stem of which is secured to the window-carrying frame or slide; the lower bottoms of these cylinders being connected together by two distinct conduits one of which can be connected with the air pressure tank and the other with the outer air by means of a delivery-valve, of a special-system, located at any suitable place of the vehicle and allowing to obtain from a distance and without any stress the vertical displacement of a window or glass-pane in one or the other direction, as well as the stopping of the latter at any required height or level.

When this device is used for controlling or operating the windows of motor-car doors, it has added thereto a system of hollow brackets which allow the opening and closing of said doors as well as the suitable circulation of the fluid under pressure.

The accompanying drawing shows by way of example the controlling or operating device made according to the present invention and used for operating a door window and a front-window of a motor-car.

Figs. 2 and 3 are also two front elevations showing schematically the device as used in connection with the front-window of a car, the same being respectively in the closed and in the open positions.

Figs. 4 to 6 are respectively a front elevation, an end view and a vertical longitudinal section of the delivery valve.

Fig. 7 is a detail showing the way in which a piston is mounted on the window-carrying slide.

Figs. 8 and 9 show, in front elevation and in plan, the hollow bracket for a car-door.

Figure 1:
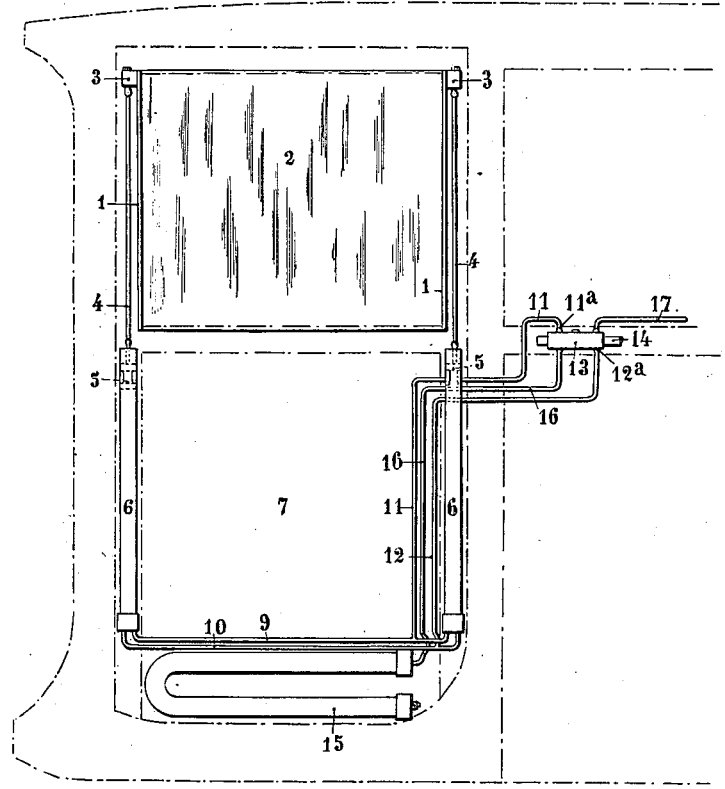
Figure 1 shows schematically a front elevation of the device as used in connection with the car-door.
Figure 3:
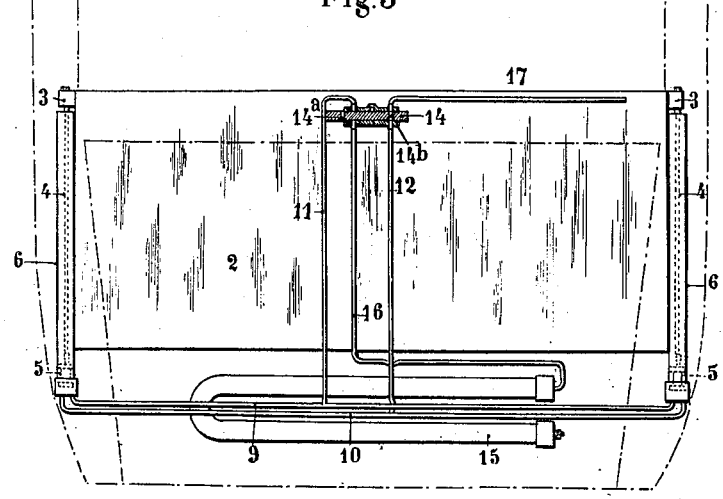

Referring to the drawing, it will be observed that the sides or frame-parts 1 carrying in the usual way the glass-window or pane 2 are each provided at their upper part with a boss or projection 3 from which hangs the stem 4 of a piston 5 located in a cylinder 6 suitably mounted in a vertical recess provided either in the door 7 (Fig. 1) or in the front panel 8 of the body (Fig. 2) in the case of a front window.

The lower parts of the two cylinders 6 are connected together by means of two distinct tubes 9 and 10 respectively communicating through tubes or conduits 11 and 12, with ports $11^a$ and $12^a$ provided in the chamber 13 of the delivery valve 14; this chamber 13 being on the other hand connected with an air pressure tank 15 through the tube 16 and with the atmosphere, through the tube 17; the tubes 16 and 17 being connected with the valve-chamber through ports or openings $16^a$ and $17^a$. The air pressure tank 15 is placed in any suitable part of the car and preferably, as shown in the drawing, between the cylinders 6 which are to be fed by it, that is to say on the lower part of the door 7 (Fig. 7) or of the front-panel 8 of the body (Fig. 2).

The delivery valve is also located in any suitable place inside the car and preferably as shown in Fig. 1 on the rear side-rail or arm and within reach of the hand of the passengers.

It consists, as clearly shown in Figs. 4 to 6, of a socket 13 in which the valve body 14 can be longitudinally moved by hand, this body 14 being provided with ports which can respectively be brought to register with ports $11^a$ and $16^a$, $17^a$ and $12^a$ of the valve-chamber or in the intermediate position shown in Fig. 6.

When the port or hole $14^a$ of the valve 14 connects together the ports $11^a$ and $16^a$, it causes the air pressure tank 15 to communicate through the tubes 16 and 11 with the cylinders 6 so that the pistons 5 and the window 2 are lifted as long as the valve 14 occupies the above indicated position in which it can be maintained through the interlocking of a spring bolt or latch 18 with a recess 19 of the valve.

On the contrary, when the port 14$^b$ of valve 14 connects the two ports 17$^a$ and 12$^a$, the two cylinders 6 are in connection with the atmosphere through the tubes 10, 12 and 17 so that the pistons 5 and the window 2 come down again.

The valve 14 can be held in the position through the spring bolt 18 entering the notch or recess 20, the window then coming down to its lowermost position.

When it is desired to limit the down-and-up motion of the window, the notch or recess 21 is brought, during its lowering or lifting, opposite the bolt 18 so as to cut off the connection of the cylinders 6 with the air pressure tank 15 and with the atmosphere.

When the operating or controlling device as above described is used in connection with vehicle doors, the several tubes 11, 12 and 16 are cut where they pass the hinge point of the door; the so cut parts of each of these tubes are connected with a sort of bracket (Figs. 8 and 9) allowing the different tubes to follow the opening and closing motions of the door.

These brackets consist of casings or boxes 23 connected two by two by means of hinge-bolts or pins 24 and provided with tubes 25 connecting the casings together; the end casings being furthermore provided with tubes 26 and 27 allowing the fluid under pressure to come in and out.

Referring to Fig. 7, it will be observed that the pistons 5 consist of a cylindrical body having at its ends two disks 28 against the external face of which leather washers 29 are pressed.

The space left between the disks 28 and the cylinder 6 form an annular chamber filled with oil which thus insures the continuous lubricating of the piston and the tightness thereof, a screw 30 allowing furthermore to regulate the pressure which the oil exerts upon the internal wall of the cylinder 6.

The details of construction above described are of course given by way of example only and the forms, materials and sizes of the different parts as well as the detail arrangements may of course vary without departing from the principle of the invention.

The air pressure tank could for instance be of any other shape and the fluid contained therein could be pressed by means of a pump or of the inflator of the car; a single tank can of course be used to operate the whole of the windows of a vehicle of any kind.

Claims:

1. In a device for operating windows of cars and other vehicles, the combination with the window sash, of two vertical cylinders on opposite sides of the window, a piston in each cylinder and having their piston rods connected with the window sash, a valve casing having a port open to the atmosphere, two tubes connecting the lower ends of the cylinders and each having a branch connected with the valve casing, an air pressure tank, a tube leading from the air pressure tank to the valve casing, and a valve in the casing for establishing communication between the tube of the air pressure tank and the branch of one tube connecting the cylinders and establishing communication between the branch of the other cylinder connecting tube and the port of the valve casing open to the atmosphere.

2. A device for operating or controlling the windows of cars and vehicles comprising: a window-frame or slide,—two fixed cylinders vertically arranged on each side of the window-frame,—a piston in each cylinder, the stem of the piston connected to the upper part of the window-carrying frame,—an air pressure tank; a conduit upon said tank,—two tubes connecting the cylinders together at their lower part; a branch-pipe upon each of these tubes; a valve-box; two ports arranged opposite each other in said box respectively receiving one of the branch-pipes connecting the two cylinders and the pipe of the air pressure tank; two other ports or openings receiving respectively the second branch-pipe connecting the two cylinders and a tube communicating with the atmosphere; a slide valve in said box which can be longitudinally shifted or moved in the latter; two ports in said valve which can be brought according to the shiftings of the valve; either opposite the first ports of the valve-box in order to introduce compressed air into the cylinders, or opposite the two other ports so as to cut off the supply of compressed air and cause the cylinders to communicate with the atmosphere.

The foregoing specification of my "device for controlling from a distance the windows of motor-cars and other vehicles," signed by me this 30th day of December, 1920.

PIERRE SEURIN.